United States Patent
Destarac et al.

(10) Patent No.: US 9,574,022 B2
(45) Date of Patent: Feb. 21, 2017

(54) CONTROLLED FREE-RADICAL POLYMERIZATION OF N-VINYL LACTAMS IN AN AQUEOUS MEDIUM

(75) Inventors: Mathias Destarac, Paris (FR); Aymeric Guinaudeau, Louplande (FR); Stéphane Mazieres, Castanet-Tolosan (FR); James Wilson, Coye-la-Foret (FR)

(73) Assignees: RHODIA OPERATIONS, Aubervilliers (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 0 days.

(21) Appl. No.: 13/876,434

(22) PCT Filed: Sep. 22, 2011

(86) PCT No.: PCT/FR2011/052185
§ 371 (c)(1),
(2), (4) Date: Jun. 10, 2013

(87) PCT Pub. No.: WO2012/045944
PCT Pub. Date: Apr. 12, 2012

(65) Prior Publication Data
US 2013/0289214 A1    Oct. 31, 2013

(30) Foreign Application Priority Data
Sep. 27, 2010   (FR) ..................................... 10 57770

(51) Int. Cl.
| C08F 2/38 | (2006.01) |
| C08F 226/10 | (2006.01) |
| C08F 293/00 | (2006.01) |
| C08F 4/40 | (2006.01) |
| C08F 126/10 | (2006.01) |

(52) U.S. Cl.
CPC . *C08F 2/38* (2013.01); *C08F 4/40* (2013.01); *C08F 126/10* (2013.01); *C08F 226/10* (2013.01); *C08F 293/00* (2013.01); *C08F 293/005* (2013.01); *C08F 2438/03* (2013.01)

(58) Field of Classification Search
USPC .......... 525/242, 267, 280, 283, 294; 526/89, 526/222, 227, 229, 259, 263, 264
See application file for complete search history.

(56) References Cited

U.S. PATENT DOCUMENTS

| 4,002,589 A * | 1/1977 | Farley et al. .................... 525/59 |
| 6,187,884 B1 | 2/2001 | Kothrade et al. |
| 6,486,281 B1 * | 11/2002 | Kitada et al. .................. 526/264 |
| 6,869,923 B1 | 3/2005 | Cunningham et al. |
| 2006/0111531 A1 * | 5/2006 | McCormick et al. ..... 526/303.1 |

FOREIGN PATENT DOCUMENTS

| EP | 1199316 A2 * | 4/2002 | ................ C08F 4/40 |
| EP | 1510533 | 3/2005 | |
| WO | WO 2008019984 A1 * | 2/2008 | |

OTHER PUBLICATIONS

Gupta, K.C. Journal of Applied Polymer Science vol. 53 (1994) pp. 71-78.*
Pound, et al., "Unexpected Reactions Associated with the Xanthate-Mediated Polymerization of N-Vinylpyrrolidone", *Journal of Polymer Science, Part A: Polymer Chemistry*, vol. 46, pp. 6575-6593, Wiley InterScience, 2008.
Guinaudeau, et al., "Aqueous RAFT/MADIX polymerization of N-vinyl pyrrolidone at ambient temperature", *Polymer Chemistry*, vol. 3, pp. 81-84, Jan. 2012.

* cited by examiner

*Primary Examiner* — Irina S Zemel
*Assistant Examiner* — Jeffrey Lenihan
(74) *Attorney, Agent, or Firm* — B. Aaron Schulman, Esq.; Stites & Harbison, PLLC

(57) ABSTRACT

The present invention relates to a method for preparing a polymer based on N-vinyl lactam monomer units, which comprises a step (E) for controlled radical polymerization of a composition comprising:
  monomers containing (and most often consisting of) N-vinyl lactam monomers, either identical or different (and generally identical);
  an agent for controlling the radical polymerization, for example comprising a thiocarbonylthio group —S(C=S)—; and
  a radical polymerization initiator which is a redox system comprising a reducing agent (Red) and an oxidizing agent (Ox).

18 Claims, No Drawings

CONTROLLED FREE-RADICAL POLYMERIZATION OF N-VINYL LACTAMS IN AN AQUEOUS MEDIUM

CROSS-REFERENCE TO RELATED APPLICATIONS

This application is the U.S. National Phase of International Application No. PCT/FR2011/052185 filed on Sep. 22, 2011, which claims priority to French Application No. FR 1057770, filed Sep. 27, 2010, the contents of each are hereby incorporated by reference in their entireties.

The present invention relates to a method for preparing polymers with controlled mass and architecture of the poly (N-vinyl lactam) type, in particular which may be used in an aqueous medium.

Various controlled radical polymerization methods are known at the present time, notably designated under the RAFT or MADIX terminology, with which polymers with controlled architecture and mass may be obtained. These methods generally apply a reversible transfer method by addition-fragmentation typically using control agents (also so-called reversible transfer agents), for example of the xanthate type (compounds bearing —S(C=S)O— functions). As examples of such methods, mention may notably be made of those described in WO96/30421, WO 98/01478, WO 99/35178, WO 98/58974, WO 00/75207 and WO 01/42312, WO 99/35177, WO 99/31144, FR2794464 or WO 02/26836.

These so-called <<controlled radical polymerization>> methods in a well-known way lead to the formation of polymer chains which substantially all grow at the same rate, which is expressed by a linear increase in the molecular masses with the conversion and by a narrowed mass distribution, generally with a substantially constant number of chains during the whole duration of the reaction, which gives the possibility of very easily controlling the average molecular mass of the synthesized polymer (this mass is all the higher since the initial control agent concentration is low, this concentration dictating the number of growing polymer chains).

Moreover, these methods are also designated by the term of <<live>> polymerization in the sense that they lead to polymers with a so-called <<live nature>>, i.e. bearing a reactivatable chain end which allows the polymers to be engaged into subsequent controlled radical polymerization reactions.

Although efficient in the most general case, the application of these methods proves to have a limited interest today for polymerizing monomers of the N-vinyl lactam type, such as N-vinyl pyrrolidone (NVP).

Indeed, different types of radical polymerization reactions have been described, trying, with more or less success, to ensure control of the polymerization of monomers of the N-vinyl lactam type, but these methods however do not prove to be fully satisfactory, notably when it is desired to synthesize polymers in fine intended for a use within an aqueous medium.

In particular, polymerization reactions of NVP of the MADIX type have been described, applying controlling agents bearing a thiocarbonylthio group —S(C=S)— (such as xanthates).

For some of them, these methods applying control agents of the xanthate type are achieved as a mass, i.e. putting the monomers in the presence of the transfer agent, in the absence of the additional solvent or dispersant material. These mass preparation methods, of the type described for example in Macromolecules 39, 7796-7797 (2006), induce reaction media with very high viscosity. This very high viscosity is an obstacle for industrial utilization of the method and further makes it difficult to effectively control the polymerization reaction. It may further induce phenomena of caking of the medium when the conversion rate of the polymer becomes very high which inhibits, or even prevents, the possibility of redispersing the polymer within a dispersant medium.

Other polymerizations of NVP, of the RAFT or MADIX type, were carried out in an organic solvent medium, such as for example the one mentioned by the article Macromol. Symp., 229, 8-17 (2005). The methods of this type have another drawback; they lead to polymers which cannot be directly used in an aqueous medium, and therefore require additional steps for precipitation/redissolution in water, for switching of solvents, and/or for drying, which are notably expressed in terms of an increase in the cost of the method and/or in environmental impact.

More generally, the radical polymerization of NVP in the presence of a transfer agent of the xanthate type is described in the literature as being unsuitable for effective preparation of polymers with a properly controlled architecture and which may be directly used in an aqueous medium. In particular, the difficulties encountered with this reaction are mentioned in Polym. Sci., Part A: Polym. Chem., 46, 6575-6593 (2008), this article indicating that NVP undergoes intrinsic secondary reactions which are detrimental to the polymerization reaction. This document further sets aside the possibility of a polymerization in an aqueous medium, by invoking the hydrolytic instability of the control agent of the xanthate type.

Other controlled polymerizations of N-vinyl lactam monomers have been described, which apply control agents other than xanthates, and which do not lead either to polymers with a sufficiently controlled architecture and which may be directly utilized in an aqueous medium. In particular, the articles published on this subject never mention a possible controlled polymerization in an aqueous medium. And for a good reason: It is found that the conditions described in these documents are not actually transposable in an aqueous medium. Within this scope, reference may notably be made to the publications published in Polymer, 48, 2835-2842 (2007); J. Polym. Sci., Part A: Polym. Chem. 2006, 44, 5719-5728; JACS, 131,2100 (2009) and Angew. Chem. Int. Ed., 46, 1304 (2007).

An object of the present invention is to provide a method for preparing polymers based on N-vinyl lactam monomer units which gives access both to effective control of the architecture of the polymer and to the possibility of directly using the synthesized polymers in an aqueous medium. The notion of <<polymers based on N-vinyl lactam monomer units>> in the sense of the present invention, encompasses poly(N-vinyl lactams) and more widely, polymers comprising at least one block based on N-vinyl lactam monomer units. The sought control of the polymerization according to the invention is particularly directed to the architecture of poly(N-vinyl lactam) block constituents of all or part of the synthesized polymer.

In order to achieve the aforementioned goal, a novel method for controlled radical polymerization of N-vinyl lactam monomers is proposed according to the present invention, which may be carried out in an aqueous medium, and which leads to effective control of the polymerization, while providing polymers which may be used directly in an aqueous medium.

More specifically, according to a first aspect, the object of the present invention is a method for preparing a polymer based on N-vinyl lactam monomer units, which comprises a step (E) for controlled radical polymerization of a composition comprising:

monomers containing (and most often consisting of) N-vinyl lactam monomers, either identical or different (and generally identical);

an agent for controlling radical polymerization, for example comprising a thiocarbonylthio group —S(C═S)—; and a radical polymerization initiator which is a redox system, comprising a reducing agent (Red) and an oxidizing agent (Ox), where the difference between the standard redox potentials of the oxidizer (Ox) and of the reducing agent (Red), i.e. the difference ($E_{ox}$-$E_{red}$), is of at least 1V.

According to another particular aspect, the object of the present invention is polymers of the type obtained at the end of the method of the invention.

Within the scope of the present invention, the inventors have brought to light that the application of step (E) as defined above gives the possibility of getting rid of the drawbacks observed with the polymerization methods which have been disclosed in the state of the art.

More specifically, the work which has been achieved by the inventors has now given the possibility of demonstrating that surprisingly, considering the data of the literature, it proves in fact to be possible to achieve radical polymerization of N-vinyl lactam monomer units both in an aqueous medium and in an effectively controlled way, provided that this radical reaction is initiated by means of a redox system. This possibility of controlled polymerization in an aqueous medium opens the route to the synthesis of poly(N-vinyl lactam) with a very well controlled architecture and which may be used in water or in aqueous media directly at the end of the polymerization step.

Taking into account the application of the redox system in step (E), this step is advantageously conducted in an aqueous medium, notably by using water as the single solvent. It is thus possible to obtain a polymer directly in an aqueous medium without having to use solvents, which makes the method particularly suitable for use on an industrial scale.

The advantageous effects demonstrated by the inventors within the scope of the present invention are generally all the more marked since the difference between the standard redox potentials of the oxidizer and of the reducing agent ($E_{ox}$-$E_{red}$) is significant. Notably, in order to obtain a flow of radicals allowing polymerization up to high conversion rates, the difference between the standard redox potentials of the oxidizer (Ox) and of the reducing agent (Red), i.e. the difference ($E_{ox}$-$E_{red}$) is of at least 1V, more preferentially of at least 1.2V, for example between 1.3 and 2V.

Particularly interesting results have notably been observed when the control agent bears a thiocarbonylthio group —S(C═S)—, i.a. when this is a control agent bearing a xanthate function —S(C═S)O—, for example bearing an O-ethyl xanthate function of formula —S(C═S)OCH$_2$CH$_3$. Advantages of the same nature may be observed with other control agents, such as for example dithiocarbamates or trithiocarbamates.

Moreover, notably when the control agent bears a thiocarbonylthio group —S(C═S), the obtained advantages are notably most particularly clear when the N-vinyl lactam monomers comprise (and in particular when they consist of) N-vinylpyrrolidone (NVP) monomers.

In addition to the aforementioned advantages, the application of an initiator of the redox type in the controlled radical polymerization step (E) of the method of the invention accessorily has another non-negligible benefit, i.e. this polymerization step does not require the application of high temperatures. In particular, the polymerization reaction of step (E) may be conducted at temperatures much lower than temperatures of the order of 60 to 80° C. at which the reaction is typically applied in methods of the state of the art.

In addition to a low energy cost, it is found that this possibility of operating at a low temperature gives the possibility of preserving the live nature of the polymer chains being formed, which leads to further improved control of the reaction and also allows the application of the polymers from step (E) in subsequent polymerization steps with other monomers, in order to synthesize sequenced polymers according to techniques well known per se. More specifically, the work carried out by the inventors within the scope of the present invention has given the possibility of demonstrating that temperatures of the order of 60 to 80° C. may, if they are maintained for a too long time, degrade the reactive ends of the polymers being formed, in particular when control agents of the xanthate type are used. Notably, in order to inhibit as far as possible such a degradation of the reactive ends of the polymers, it is recommended to conduct step (E) at a temperature below 40° C., more preferentially at a temperature below 30° C. Advantageously, the step (E) may be conducted at room temperature (typically from 10 to 30° C.), which i.a. has the advantage of not having to apply a preheating step prior to polymerization, which is expressed in terms of reduced method costs. The step (E) may alternatively be conducted at temperatures specifically maintained low, for example below 20° C., even below 10° C.

The possibility of conducting the step (E) at a low temperature moreover gives the possibility of contemplating its application for the polymerization of N-vinylcaprolactam (NVCL) in an aqueous medium (in water or, advantageously in a mixture of water and of a water-soluble solvent), which requires polymerization at a temperature below its cloud point which is 32° C. Within this scope, the method of the invention may notably be applied for the synthesis of poly(N-vinylcaprolactam) or of amphiphilic polymers based both on NVCL and NVP monomer units.

Different characteristics and advantageous embodiments of the method of the invention will now be described in more detail.

The N-Vinyl Lactam Monomers

These are ethylenically unsaturated monomers which are applied in the control radical polymerization reaction of step (E). Typically, these are compounds fitting the following formula:

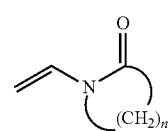

wherein n is an integer ranging from 2 to 6, typically equal to 3 (N-vinylpyrrolidone), 4 or 5 (N-vinylcaprolactam).

Preferably, the monomers used in step (E) comprise N-vinylpyrrolidone NVP. According to a particular embodiment, the whole of the monomers used in step (E) are NVP monomers.

Other N-vinyl lactam monomers may also prove to be advantageous according to the invention, among which mention may notably be made in a non-limiting way of N-vinylcaprolactam.

According to a possible embodiment, the N-vinyl lactam monomers may be copolymerized in step (E) as a mixture with other non-(N-vinyl lactam) ethylenically unsaturated monomers, which typically leads to the formation of a random polymer block or with a gradient during step (E). In this scenario, the N-vinyl lactam monomer content generally remains greater than or equal to 50%, more preferentially greater than or equal to 70% (for example at least 80%, or even at least 90%), by mass based on the total mass of applied monomers in step (E).

Among the non-(N-vinyl lactam) ethylenically unsaturated monomers which may be interesting for copolymerization with N-vinyl lactam monomers during step (E), mention may notably be made of N-vinylimidazole. Other non-(N-vinyl lactam) monomers may be used, among which mention may be made in a non-limiting way of acrylic acid, AMPS, APTAC, N,N'-dimethyl acrylamide NIPAM, N,N-diethyl acrylamide, DADMAC (diallyl dimethyl ammonium chloride), vinylphosphonic acid, dialkylvinyl phosphonates or else further vinyl sulfonate.

The Control Agent

Most control agents known today in controlled radical polymerization may be applied in step (E).

According to an interesting alternative, the control agent used in step (E) is a compound bearing a thiocarbonylthio group —S(C=S)—. Preferably, this is a RAFT or MADIX control agent. According to a particular embodiment, the control agent may bear several thiocarbonylthio groups.

These may optionally be a polymer chain bearing such a group. Thus, according to a particular embodiment, the control agent used in step (E) is a live polymer stemming from a preliminary step ($E_0$) in which radical polymerization is carried out of a composition comprising:
  ethylenically unsaturated monomers:
  a radical polymerization control agent comprising at least one thiocarbonylthio group —S(C=S)—; and
  a radical polymerization initiator (a source of free radicals).

According to this embodiment, the step (E) leads to a sequenced copolymer comprising at least one poly(N-vinyl lactam) block bound to the polymer chain stemming from the polymerization of step ($E_0$).

This embodiment gives access to original sequenced copolymers. In particular, the method of the invention gives the possibility of synthesizing in water, sequenced polymers comprising a hydrophilic block associated with a poly(N-vinyl lactam) block, for example copolymers of the diblock type [hydrophilic block]-[PVP block], for example of the [polyacrylamide]-[PVP] type, which are polymers which hitherto were unaccessible since NVP is only polymerized in a non-aqueous medium. These specific polymers, not described to this day, to the knowledge of the applicant, form another particular object of the present invention.

More generally, the control agent applied in step (E) advantageously fits the formula (A) below:

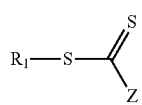

(A)

wherein:
  Z represents:
    a hydrogen atom,
    a chlorine atom,
    an optionally substituted alkyl, optionally substituted aryl radical
    an optionally substituted heterocycle,
    an optionally substituted alkylthio radical,
    an optionally substituted arylthio radical,
    an optionally substituted alkoxy radical,
    an optionally substituted aryloxy radical,
    an optionally substituted amino radical,
    an optionally substituted hydrazine radical,
    an optionally substituted alkoxycarbonyl radical,
    an optionally substituted aryloxycarbonyl radical,
    an optionally substituted carboxy, acyloxy radical,
    an optionally substituted aroyloxy radical,
    an optionally substituted carbamoyl radical,
    a cyano radical,
    a dialkyl- or diaryl-phosphonato radical,
    a dialkyl-phosphinato or diaryl-phosphinato radical, or
    a polymer chain,
  and
  $R_1$ represents:
    an optionally substituted alkyl, acyl, aryl, aralkyl, alkene or alkyne group,
    a carbonaceous ring or an aromatic heterocycle, either saturated or not, optionally substituted or
    a polymer chain.

The groups $R_1$ or Z, when they are substituted, may be substituted with optionally substituted phenyl groups, optionally substituted aromatic groups, carbonaceous rings either saturated or not, heterocycles either saturated or not, or alkoxycarbonyl or aryloxycarbonyl (—COOR), carboxy (—COOH), acyloxy (—O₂CR), carbamoyl (—CONR₂), cyano (—CN), alkylcarbonyl, alkyarylcarbonyl, arylcarbonyl, arylalkylcarbonyl, phthalimido, maleimido, succinimido, amidino, guanidino, hydroxyl (—OH), amino (—NR₂) groups, a halogen, perfluoralkyl allyl, epoxy, alkoxy (—OR), S-alkyl, S-aryl groups, groups having a hydrophilic or ionic nature such as alkaline salts of carboxylic acids, alkaline salts of sulfonic acid, chains of polyalkylene oxide (PEO, POP), cationic substituants (quaternary ammonium salts), R representing an alkyl or aryl group, or a polymer chain.

According to a particular embodiment, $R_1$ is an alkyl group either substituted or not, preferably substituted.

The optionally substituted alkyl, acyl, aryl, aralkyl or alkynyl groups generally have 1 to 20 carbon atoms, preferably 1 to 12 and more preferentially 1 to 9 carbon atoms. They may be linear or branched. They may also be substituted with oxygen atoms, notably in the form of esters, with sulfur or nitrogen atoms.

Among alkyl radicals, mention may notably be made of methyl, ethyl, propyl, butyl, pentyl, isopropyl, tert-butyl, pentyl, hexyl, octyl, decyl or dodecyl radicals.

The alkynyl groups are generally radicals with 2 to 10 carbon atoms, they have at least one acetylenic unsaturation, such as the acetylenyl radical.

The acyl group is a radical generally having from 1 to 20 carbon atoms with a carbonyl group.

Among aryl radicals, mention may notably be made of the phenyl radical optionally substituted, notably with a nitro or hydroxyl function.

Among aralkyl radicals, mention may notably be made of the benzyl or phenethyl radicals optionally substituted notably with a nitro or hydroxyl function.

When $R_1$ or Z is a polymer chain, this polymer chain may stem from a radical or ion polymerization or from a polycondensation.

Within the scope of the present invention, it is notably interesting to use as control agents, xanthates, dithiocarbamates or dithiocarbazates.

Advantageously, as a control agent in step (E), xanthate compounds are used such as for example O-ethyl-S-(1-methoxycarbonyl ethyl) xanthate of formula ($CH_3CH(CO_2CH_3)$)S(C=S)$OCH_2CH_3$. The compound marketed by Rhodia as Rhodixan A1 proves to be notably of interest.

The Redox System

It comprises two agents, i.e. the oxidizing agent and the reducing agent, which may be introduced simultaneously or else consecutively in step (E). According to an interesting embodiment, the reducing and oxidizing agents are separately introduced into the medium of step (E), which allows delaying of the initiation of the polymerization until the introduction of the second agent. Advantageously, step (E) is conducted (i) first by forming a mixture comprising one of the oxidizing or reducing agents in a mixture with the monomers and the control agents and then (ii) by adding to this mixture the other agent (the reducing or oxidizing agent, respectively).

As above in the present description, within the scope of the invention, it is recommended that the difference between the standard redox potentials of the oxidizing agent and of the reducing agents ($E_{ox}$-$E_{red}$) be comprised between 1 and 2V.

Moreover, notably for avoiding oxidation reactions of the N-vinyl lactam monomers, it may be interesting if the standard oxidation redox potential $E_{ox}$ of the oxidizing agent (Ox) applied in step (E) be lower (preferably by at least 0.2V, more preferentially by at least 0.5V, or even by at least 1V) than that of the N-vinyl lactam monomers used. More generally, it is preferable that the oxidation standard redox potential $E_{ox}$ of the oxidizing agents (Ox) be sufficiently low so as not to oxidize the N-vinyl lactam monomers. The NVP monomers are most particularly sensitive to oxidation and it is preferable, when NVP is polymerized, that the oxidation potential $E_{ox}$ of the oxidizing agent be less than 2V, more preferentially less than 1.8V, for example between 1.5 and 1.8V. Particularly suitable oxidizing agents within this scope are hydroperoxides, and notably tertbutyl hydroperoxide (t-BuOOH), which is notably of interest when NVP monomers are polymerized. Hydrogen peroxide is another possible oxidizing agent.

On the other hand, notably when the monomers used in step (E) are monomers of the NVP type, it is preferable that the agents present in the redox system do not contain any acids able to induce parasitic reactions of the monomers capable of leading to undesirable byproducts, and more generally that they do not contain compounds having a sufficiently small pKa for inducing such reactions. Thus, preferably, it is notably recommended to use reducing (Red) and oxidizing (Ox) agents having a pKa of more than 4, more preferentially more than 6, or even 6.5 and preferably at least 7, which allows reduction in the level of byproducts, generally at most a few percent in the synthesized polymer. Within this scope, a particularly suitable reducing agent is sodium sulfite (pKa=7.2), which for example allows limitation of the level of byproducts below 5% during polymerization of NVP.

Suitable redox systems for applying step (E) of the method of the invention comprise tertbutyl hydroperoxide (t-BuOOH) as an oxidizing agent, associated with a reducing agent selected from ascorbic acid or sodium sulfite.

The tertbutyl hydroperoxide/sodium sulfite redox system proves to be most particularly interesting, notably when the monomers used in step (E) are or comprise NVP monomers. The use of this system in step (E) allows polymerization of NVP at room temperature and in water with a very low level of byproducts, typically remaining much lower than 5%.

Uses of the Synthesized Polymers

Notably, when it is conducted under the aforementioned preferential conditions, step (E) of the method of the invention gives the possibility of rapidly, simply and effectively obtaining polymers based on N-vinyl lactam monomer units which may be directly used in an aqueous medium with very good control of the architecture of the synthesized polymers and with very good stability of the end functionality of the synthesized polymers (which may notably be detected by $^1$H MNR analysis and by MALDI-TOF mass spectrometry).

Taking into account the integrity of the stability of their reactive end, the polymers obtained according to step (E) may be used as live polymers for the synthesis of sequenced copolymers comprising the block synthesized in step (E) associated with other blocks. Within this scope, the polymers obtained in step (E) may be used as control agents in a polymerization step after step (E).

Thus, according to a particular embodiment, the method of the invention may be a method for synthesizing sequenced copolymers which includes, after step (E), a step (E1) for controlled radical polymerization of a mixture comprising:

all or part of the polymer as obtained at the end of step (E);

ethylenically unsaturated monomers; and a source of free radicals.

This embodiment gives access to sequenced copolymers based on poly(N-vinyl lactams) produced in a purely aqueous medium. In particular, the method of the invention gives the possibility of synthesizing in water, sequenced polymers comprising two blocks based on N-vinyl lactam monomers.

Alternatively, depending on the contemplated applications for the polymer, it may be desirable to deactivate the reactive end of the polymer obtained at the end of steps (E). According to this other embodiment, the method then comprises, after step (E), a step for chemical treatment of the chain end, which may advantageously be carried out directly in the water at the end of step (E). For example, when the control agent used in step (E) is a xanthate, the xanthate reactive end obtained on the polymer may be deactivated in order to deprive the polymer of its live nature, for example by action of hydrogen peroxide which oxidizes the xanthate reaction end into various oxidized species (notably of the thioester type —S(C=O)— and —SO$_3$H). According to an interesting embodiment, the xanthate reactive ends may be deactivated by simply increasing the temperature, which gives the possibility of achieving deactivation of the end function without having to use an additional chemical reagent.

The polymers prepared according to the invention have a polydispersity index ($M_w/M_n$) typically much less than 1.8 and notably less than or equal to 1.6.

The polymers prepared according to the invention may be single-block, random or gradient polymers.

This may alternatively be a polymer of the sequenced type, for example diblock or multi-block (triblock for example), comb, grafted, or optionally star polymers. To do this, the method of the invention advantageously contains at least one controlled radical polymerization step ($E_0$) of the aforementioned type before step (E) and/or a step ($E_1$) of the type described above in the present description, wherein the live polymer synthesized in step (E) is used as a control agent in a subsequent controlled radical polymerization reaction.

The polymers as obtained according to the invention because of their hydrophilicity find various uses in multiple fields. They may i.a. be used for formulating cosmetic compositions, body care compositions, ingestible compositions, adhesives, or else in more specific applications (latex stabilizer, petroleum, formulation of biological or medical compositions etc.). They are also useful for surface treatment notably as a detergent, or further for formulating plant protection compositions or intended for the agricultural field.

The invention and its advantages will be further illustrated by the exemplary applications given hereafter.

EXAMPLE 1

Synthesis According to the Invention of a poly(NVP) of Low Molar Mass—a Tertbutyl Hydroperoxide/Sodium Sulfite Pair In a 15 mL Schlenk at room temperature (20° C.), 2 g of N-vinylpyrrolidone, 1 g of distilled water, 150 mg of O-ethyl-S-(1-methoxycarbonyl ethyl)xanthate of formula $(CH_3CH(CO_2CH_3))S(C=S)OEt$ and 40 mg of a solution of tertbutyl hydroperoxide (70% by mass in water) are introduced.

The reaction mixture was degassed with extra pure argon bubbling for 30 minutes. Next 40 mg of sodium sulfite were added in one go under an argon stream.

The reaction medium was left with stirring for 24 hours at room temperature.

At the end of the reaction, a 92% conversion was determined by $^1H$ NMR. The presence of the xanthate end is also observed in $^1H$ NMR.

A steric exclusion chromatography analysis in DMF additive with LiCl (0.1N) with a relative calibration of poly (methyl methacrylate) provides the following values of the number average molar mass ($M_n$) and of the polymolecularity index ($M_w/M_n$):

$M_n$=3,600 g/mol $M_w/M_n$=1.18.

A MALDI-TOF spectrometry analysis with the 4-(4-nitrophenylazo)resorcinol matrix without any cationizing agent confirms the structure of the expected polymer.

EXAMPLE 2

Synthesis According to the Invention of a poly(NVP) with a High Molar Mass—Tertbutyl Hydroperoxide/Sodium Sulfite Pair In a 15 mL Schlenk at room temperature (20° C.), 2 g of N-vinylpyrrolidone, 1 g of distilled water, 43 mg of O-ethyl-S-(1-methoxycarbonyl ethyl)xanthate of formula $(CH_3CH(CO_2CH_3))S(C=S)OEt$ and 40 mg of a solution of tertbutyl hydroperoxide (70% by mass in water) are inroduced.

The reaction mixture was degassed with extra argon bubbling for 30 minutes.

Next 40 mg of sodium sulfite were added in one go under an argon stream.

The reaction medium was left with stirring for 24 hours at room temperature.

At the end of the reaction, an 89% conversion was determined by $^1H$ NMR.

The presence of the xanthate end is also observed in $^1H$ NMR.

A steric exclusion chromatography analysis in DMF additive with LiCl (0.1N) with a relative calibration of poly (methyl methacrylate) provides the following values of the number average molar mass ($M_n$) and of the polymolecularity index ($M_w/M_n$):

$M_n$=22,700 g/mol $M_w/M_n$=1.4

EXAMPLE 3

Synthesis According to the Invention of a poly(NVP) with a Low Molar Mass—Tertbutyl Hydroperoxide/Ascorbic Acid Pair In a 15 mL Schlenk at room temperature (20° C.), 2 g of N-vinylpyrrolidone, 1 g of distilled water, 230 mg of O-ethyl-S-(1-methoxycarbonyl ethyl)xanthate of formula $(CH_3CH(CO_2CH_3))S(C=S)OEt$ and 40 mg of a solution of tertbutyl hydroperoxide (70% by mass in water) are introduced.

The reaction mixture was degassed with extra pure argon bubbling for 30 minutes.

Next 45 mg of ascorbic acid were added in one go under an argon stream.

The reaction medium was left with stirring for 24 hours at room temperature.

At the end of the reaction, an 98% conversion was determined by $^1H$ NMR.

The presence of the xanthate end is also observed in $^1H$ NMR.

A steric exclusion chromatography analysis in DMF additive with LiCl (0.1N) with a relative calibration of poly (methyl methacrylate) provides the following values of the number average molar mass ($M_n$) and of the polymolecularity index ($M_w/M_n$):

$M_n$=3,100 g/mol $M_w/M_n$=1.18.

A MALDI-TOF spectrometry analysis with the 4-(4-nitrophenylazo)resorcinol matrix without any cationizing agent confirms the structure of the expected polymer.

EXAMPLE 4

Synthesis According to the Invention of a poly(NVP) with a High Molar Mass—Tertbutyl Hydroperoxide/Ascorbic Acid Pair In a 15 mL Schlenk at room temperature (20° C.), 4 g of N-vinylpyrrolidone, 2 g of distilled water, 21 mg of O-ethyl-S-(1-methoxycarbonyl ethyl)xanthate of formula $(CH_3CH(CO_2CH_3))S(C=S)OEt$ and 80 mg of a tertbutyl hydroperoxide solution (70% by mass in water) are introduced.

The reaction mixture was degassed with extra pure argon bubbling for 30 minutes. Next 90 mg of ascorbic acid were added in one go under an argon stream.

The reaction medium was left with stirring for 24 hours at room temperature.

At the end of the reaction, an 89% conversion was determined by $^1H$ NMR.

The presence of the xanthate end is also observed in $^1H$ NMR.

A steric exclusion chromatography analysis in DMF additive with LiCl (0.1N) with a relative calibration of poly (methyl methacrylate) provides the following values of the number average molar mass ($M_n$) and of the polymolecularity index ($M_w/M_n$):

$$M_n = 25{,}500 \text{ g/mol } M_w/M_n = 1.5$$

EXAMPLE 5

Synthesis According to the Invention of a poly(acrylic acid)-b-poly(N-vinyl pyrrolidone) Diblock Copolymer—Tertbutyl Hydroperoxide/Sodium Sulfite Pair

5.1: Synthesis of a Live poly(acrylic acid)polymer with a Xanthate End (Polymer P5)

In a 15 mL flask at room temperature, 4 g of acrylic acid, 1.5 g of distilled water, 2 g of ethanol, 1 g of O-ethyl-S-(1-methoxycarbonyl ethyl)xanthate of formula $(CH_3CH(CO_2CH_3))S(C\!=\!S)OEt$ and 25 mg of 4,4'-azobis(4-cyanovaleric) acid are introduced.

The reaction mixture was degassed with extra pure argon bubbling for 30 minutes.

The flask was then placed in a thermostated oil bath at 60° C. and the medium was left with stirring at this temperature for 3 hours.

At the end of the reaction, a 98% conversion was determined by $^1$H NMR.

A number molar mass $M_n = 800$ g/mol is calculated by $^1$H NMR for the thereby prepared polymer P5.

5.2: Synthesis of the Diblock Copolymer (Use of P5 as a Control Agent)

The reaction mixture from step 5.1 was dried in vacuo and then taken up in ethanol and precipitated from diethylether. The obtained precipitate was dried in vacuo for 24 hours in order to remove the residual solvents, whereby a polymer P5 is obtained as a powder.

105 mg of this powder were introduced into a 15 mL Schlenk at room temperature, and then 1 g of N-vinylpyrrolidone, 2 g of distilled water and 40 mg of a solution of tertbutyl hydroperoxide (70% by mass in water) were added.

The reaction mixture was degassed with extra pure argon bubbling for 30 minutes.

Next, 40 mg of sodium sulfite were added in one go under an argon stream. The reaction was left with stirring for 24 hours at room temperature.

At the end of the reaction a 100% conversion was determined by $^1$H NMR.

By comparing the analysis with DOSY NMR of the polymer P5 and of the copolymer from the example, the diblock nature of the copolymer is confirmed by considering the difference in the diffusion coefficients (D in $\mu m^2/s$) between P5 and the final copolymer. For P5, $D=203$ $\mu m^2/s$ while for the PAA-PVP diblock, $D=89$ $\mu m^2/s$. Further, the DOSY 2D map of the two samples gives the possibility of viewing that P5 has totally reacted during the step for polymerization of NVP, in order to be incorporated into the PAA-PVP diblock.

EXAMPLE 6

Synthesis According to the Invention of a poly(2-acrylamido-2-methylpropane-sulfonic acid)-b-poly(N-vinyl pyrrolidone) Diblock Copolymer—Tertbutyl Hydroperoxide/Sodium Sulfite Pair

6.1: Synthesis of a Live poly(2-acrylamido-2-methylpropane-sulfonic acid)polymer with a Xanthate End (Polymer P6)

In a 25 mL flask at room temperature, 8 g of a 2-acrylamido-2-methylpropane-sulfonic acid solution (50% by mass in water), 4 g of ethanol, 1 g of O-ethyl-S-(1-methoxycarbonyl ethyl)xanthate of formula $(CH_3CH(CO_2CH_3))S(C\!=\!S)OEt$ and 25 mg of 4,4'azobis(4-cyanovaleric)acid were introduced.

The reaction mixture was degassed with extra pure argon bubbling for 30 minutes

The flask was then placed in a thermostated oil bath at 60° C. and the medium was left with stirring at this temperature for 3 hours.

At the end of the reaction, a 97% conversion was determined with $^1$H NMR.

A number molar mass $M_n = 1{,}800$ g/mol is calculated by $^1$H NMR for the thereby prepared polymer P6.

6.2: Synthesis of the Diblock Copolymer

The reaction mixture from step 6.1 was dried in vacuo and then taken up in ethanol and precipitated from diethylether. The obtained precipitate was dried in vacuo for 24 hours in order to remove the residual solvents, whereby the polymer P6 was obtained as a powder.

110 mg of this powder were introduced into a 15 mL Schlenk at room temperature, and then 1 g of N-vinylpyrrolidone, 2 g of distilled water and 40 mg of a tertbutyl hydroperoxide solution (70% by mass in water) were added.

The reaction mixture was degassed with extra pure argon bubbling for 30 minutes.

Next, 40 mg of sodium sulfite were added in one go under an argon stream. The reaction was left with stirring for 24 hours at room temperature.

At the end of the reaction, a 99% conversion was determined by $^1$H NMR.

By comparing the DOSY NMR analysis of the polymer P6 and of the copolymer from the example, the diblock nature of the copolymer is confirmed by considering the difference in the diffusion coefficients (D in $\mu m^2/s$) between P6 and the final copolymer. For P6, $D=260$ $\mu m^2/s$ while for the PAA-PVP diblock, $D=66$ $\mu m^2/s$. Further, the DOSY 2D map of both samples gives the possibility of viewing that P6 has totally reacted during the step for polymerization of NVP, in order to be incorporated into the PAMPS-PVP diblock.

EXAMPLE 7

Synthesis According to the Invention of a poly(acrylamidopropyl-trimethylammonium chloride)-b-poly(N-vinyl pyrrolidone)—Tertbutyl Hydroperoxide/Sodium Sulfite Pair

7.1: Synthesis of a Live poly(acrylamidopropyltrimethylammonium chloride)polymer with a Xanthate End (Polymer P7)

In a 25 mL flask, at room temperature, 4 g of a solution of acrylamidopropyl-trimethylammonium chloride (75% by mass in water), 3 g of distilled water, 4.5 g of ethanol, 750 mg of O-ethyl-S-(1-methoxycarbonyl ethyl)xanthate of formula (CH₃CH(CO₂CH₃))S(C=S)OEt and 15 mg of V-50 initiator (2,2'azobis(2-methyl-propionamidine)dihydrochloride) are introduced.

The reaction mixture was degassed with extra pure argon bubbling for 30 minutes.

The flask was then placed in a thermostated oil bath at 60° C. and the medium was left with stirring at this temperature for 3 hours.

At the end of the reaction, a 100% conversion was determined by ¹H NMR.

A number molar mass $M_n$=1,500 g/mol is calculated by ¹H NMR for the thereby prepared polymer P7.

7.2: Synthesis of the Diblock Copolymer

The reaction mixture from step 7.1 was dried in vacuo and then taken up in ethanol and precipitated from diethylether. The obtained precipitate was dried in vacuo for 24 hours in order to remove the residual solvents, whereby the polymer P7 was obtained as a powder.

110 mg of this powder was introduced into a 15 mL Schlenk at room temperature, and then 1 g of N-vinylpyrrolidone, 2 g of distilled water and 40 mg of a tertbutyl hydroperoxide solution (70% by mass in water) were added.

The reaction mixture was degassed with extra pure argon bubbling for 30 minutes.

Next, 40 mg of sodium sulfite were added in one go under an argon stream, the reaction was left with stirring for 24 hours at room temperature.

At the end of the reaction, a 99% conversion was determined by ¹H NMR.

By comparing the analysis by DOSY NMR of the polymer P7 and of the copolymer from the example, the diblock nature of the copolymer is confirmed by considering the difference in the diffusion coefficients (D in μm²/s) between P7 and the final copolymer. For P7 D=204 μm²/s while for the PAA-PVP diblock, D=63 μm²/s. Further, the DOSY 2D map of both samples gives the possibility of viewing that P7 has totally reacted during the step for polymerization of NVP, in order to be incorporated into the PAPTAC-PVP diblock.

EXAMPLE 8

Synthesis According to the Invention of a poly(acrylamide)-b-poly(N-vinyl pyrrolidone)diblock Copolymer—Tertbutyl Hydroperoxide/Sodium Sulfite Pair

8.1: Synthesis of a Live poly(acrylamide)polymer with a Xanthate End (Polymer P7)

10 g of an acrylamide solution stabilized with copper (50% by mass in water), 5.2 g of ethanol, 1.2 g of O-ethyl-S-(1-methoxycarbonyl ethyl)xanthate of formula (CH₃CH(CO₂CH₃))S(C=S)OEt and 160 mg of a tertbutyl hydroperoxide solution (70% by mass in water) were introduced into a 25 mL flask at room temperature.

The reaction mixture was degassed with extra pure argon bubbling for 30 minutes. Next, 160 mg of sodium sulfite were added in one go under an argon stream. The reaction was left with stirring for 24 hours at room temperature.

At the end of the reaction, an 85% conversion is determined by ¹H NMR.

A number molar mass $M_n$=1,200 g/mol is calculated by ¹H NMR for the thereby prepared polymer P8.

8.2: Synthesis of the Diblock Copolymer

The reaction medium from step 8.1 was dried in vacuo and then taken up in ethanol and precipitated from diethyl ether. The obtained precipitate was dried in vacuo for 24 hours in order to remove the residual solvents, whereby the polymer P8 was obtained as a powder.

100 mg of this powder were introduced into a 15 mL Schlenk at room temperature, and then 1 g of N-vinylpyrrolidone, 2 g of distilled water and 40 mg of a tertbutyl hydroperoxide solution (70% by mass in water) were added.

The reaction mixture was degassed with extra pure argon bubbling for 30 minutes. Next, 40 mg of sodium sulfite were added in a single go under an argon stream. The reaction was left with stirring for 24 hours at room temperature.

At the end of the reaction, a 99% conversion was determined by ¹H NMR.

By comparing the analysis by DOSY NMR of the polymer P8 and of the copolymer from the example, the diblock nature of the copolymer is confirmed by considering the difference in the diffusion coefficients (D in μm²/s) between P8 and the final copolymer. For P8, D=185 μm²/s while for the PAM-PVP diblock, D=63 μm²/s. Further, the DOSY 2D map of both samples gives the possibility of viewing that P8 has totally reacted during the step for polymerization of NVP, in order to be incorporated into the PAM-PVP diblock.

The invention claimed is:

1. A method for preparing a polymer based on N-vinyl lactam monomer units, which comprises a controlled radical polymerization step (E) for a composition comprising:
   monomers containing N-vinyl lactam monomers either identical or different; and
   a control agent for the radical polymerization; and
   a radical polymerization initiator which is a redox system, comprising a reducing agent and an oxidizing agent, wherein the difference between the standard redox potentials of the oxidizer and of the reducing agent ($E_{ox}$-$E_{red}$) is of at least 1V;
   wherein the control agent is a compound bearing a xanthate function —S(C=S)O—.

2. The method according to claim 1, wherein step (E) is conducted in an aqueous medium.

3. The method according to claim 1, wherein the difference between the standard redox potentials of the oxidizer and of the reducing agent ($E_{ox}$-$E_{red}$) is of at least 1.2V.

4. The method according to claim 1, wherein the control agent is O-ethyl-S-(1-methoxycarbonyl ethyl) xanthate of formula (CH₃CH(CO₂CH₃))S(C=S)OCH₂CH₃).

5. The method according to claim 1, wherein, in step (E), the N-vinyl lactam monomers are N-vinylpyrrolidone monomers (NVP).

6. The method according to claim 1, wherein step (E) is conducted at a temperature below 40° C.

7. The method according to claim 6, wherein step (E) is conducted at room temperature.

8. The method according to claim 1, wherein the oxidation standard redox potential Eox of the oxidizing agent applied in step (E) is less than that of the N-vinyl lactam monomers used.

9. The method according to claim 8, wherein, in step (E), the oxidizing agent used is tertbutyl hydroperoxide (t-BuOOH).

10. The method according to claim 1, wherein, in step (E), the reducing and oxidizing agents have a pKa of more than 4.

11. The method according to claim 1, wherein, in step (E), the reducing agent is sodium sulfite.

12. The method according to claim 1, wherein, in step (E), the reducing agent is ascorbic acid.

13. The method according to claim 1, wherein, in step (E), the oxidizing agent used is tertbutyl hydroperoxide (t-BuOOH) and the reducing agent is sodium sulfite.

14. The method according to claim 1, wherein, in step (E), the oxidizing agent used is tertbutyl hydroperoxide (t-BuOOH) and the reducing agent is ascorbic acid.

15. The method according to claim 1, for the synthesis of sequenced copolymers, which includes, after step (E), a step (E1) for controlled radical polymerization of a mixture comprising:
  all or part of the polymer as obtained at the end of step (E);
  ethylenically unsaturated monomers; and
  a source of free radicals.

16. The method according to claim 1, wherein the control agent is a compound bearing an —O-ethyl xanthate function of formula —S(C=S)OCH$_2$CH$_3$.

17. The method according to claim 1, wherein the reducing agent and the oxidizing agent are separately introduced into the medium of step (E).

18. The method according to claim 1, wherein step (E) is conducted (i) first by forming a mixture comprising one of the oxidizing or reducing agents in a mixture with the monomers and the control agents and then (ii) by adding to this mixture the other of the oxidizing or reducing agents.

* * * * *